(12) United States Patent
Rothweiler et al.

(10) Patent No.: US 12,458,386 B2
(45) Date of Patent: Nov. 4, 2025

(54) MEDICAL INSTRUMENT

(71) Applicant: Aesculap AG, Tuttlingen (DE)

(72) Inventors: Christoph Rothweiler, Donaueschingen (DE); Jana Schuele, Kreenheinstetten (DE)

(73) Assignee: Aesculap AG, Tuttlingen (DE)

( * ) Notice: Subject to any disclaimer, the term of this patent is extended or adjusted under 35 U.S.C. 154(b) by 151 days.

(21) Appl. No.: 18/292,916

(22) PCT Filed: Jul. 26, 2022

(86) PCT No.: PCT/EP2022/070885
§ 371 (c)(1),
(2) Date: Jan. 28, 2024

(87) PCT Pub. No.: WO2023/011975
PCT Pub. Date: Feb. 9, 2023

(65) Prior Publication Data
US 2024/0415530 A1 Dec. 19, 2024

(30) Foreign Application Priority Data
Aug. 3, 2021 (DE) ...................... 10 2021 208 391.9

(51) Int. Cl.
*A61B 17/29* (2006.01)
*A61B 17/00* (2006.01)

(52) U.S. Cl.
CPC .. *A61B 17/2909* (2013.01); *A61B 2017/0046* (2013.01); *A61B 2017/00477* (2013.01);
(Continued)

(58) Field of Classification Search
CPC ........ A61B 17/2909; A61B 2017/0046; A61B 2017/00477; A61B 2017/00831;
(Continued)

(56) References Cited

U.S. PATENT DOCUMENTS 5,339,800 A 8/1994 Wiita et al.
5,817,128 A 10/1998 Storz
(Continued)

FOREIGN PATENT DOCUMENTS

DE 1945659 A 3/1971
DE 4307539 A1 9/1994
(Continued)

OTHER PUBLICATIONS

Search Report received in International Application No. PCT/EP2022/070885 dated Nov. 29, 2022, with translation, 10 pages.

*Primary Examiner* — Shaun L David
*Assistant Examiner* — Rachael L Geiger
(74) *Attorney, Agent, or Firm* — Christopher A. Rothe; CM Law

(57) ABSTRACT

A medical instrument includes a handle with a fixed part and a movable part. A shaft extends between a proximal end and a distal end. The proximal end is releasably connected to the handle. The distal end has an instrument jaw that is openable and/or closable by actuation of the movable part. A push-pull element is guided axially in a cavity of the shaft and operatively connected proximally to the movable part and distally to the instrument jaw. The proximal end has an opening leading into the cavity that is configured for introducing a fluid flow in the direction of the distal end. A functional element is arranged in the cavity and has a plurality of vanes arranged offset in the circumferential direction of the shaft. The vanes are configured to generate, in the fluid flow, a swirling motion oriented in the circumferential direction of the shaft.

8 Claims, 6 Drawing Sheets

(52) U.S. Cl.
CPC .............. *A61B 2017/00831* (2013.01); *A61B 2017/2902* (2013.01); *A61B 2017/2925* (2013.01); *A61B 2017/2932* (2013.01); *A61B 2017/294* (2013.01)

(58) Field of Classification Search
CPC .... A61B 2017/2902; A61B 2017/2925; A61B 2017/2932; A61B 2017/29; A61B 17/1285; A61B 2017/0488; A61B 17/10; A61B 17/128; A61B 17/29; A61B 2017/2901; A61B 2017/2948; A61B 2090/0813; A61B 90/70; A61B 2090/701
See application file for complete search history.

(56) References Cited

U.S. PATENT DOCUMENTS

| | | | |
|---|---|---|---|
| 8,267,102 | B2 | 9/2012 | Onishi et al. |
| 2006/0282117 | A1* | 12/2006 | Berberich .......... A61B 17/0483 606/205 |
| 2009/0205687 | A1* | 8/2009 | Onishi ................. F16L 37/127 134/136 |
| 2012/0116433 | A1* | 5/2012 | Houser ................. A61B 18/04 606/169 |
| 2017/0049506 | A1 | 2/2017 | Allen, IV et al. |
| 2019/0247073 | A1* | 8/2019 | Cowley .......... A61B 17/320068 |
| 2022/0409330 | A1* | 12/2022 | Valentine ............... A61B 90/70 |

FOREIGN PATENT DOCUMENTS

| | | | |
|---|---|---|---|
| DE | 202011000828 U1 | 7/2011 | |
| EP | 0688187 B1 | 6/1998 | |
| EP | 2098185 A1 | 9/2009 | |
| WO | WO-2020036758 A2 * | 2/2020 | ......... A61B 17/1155 |

\* cited by examiner

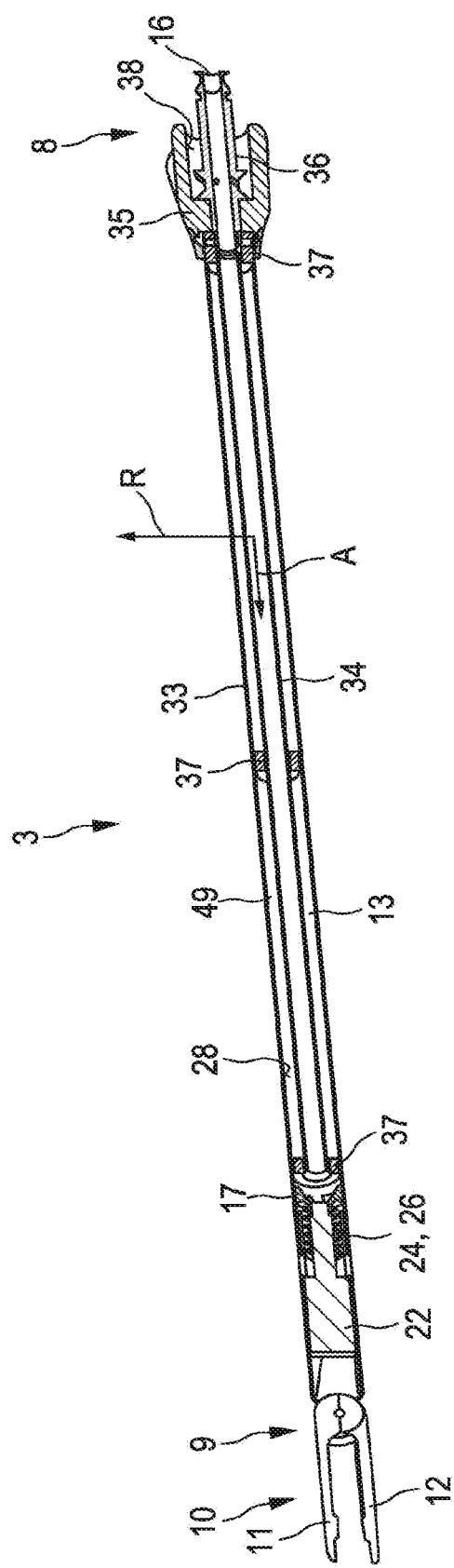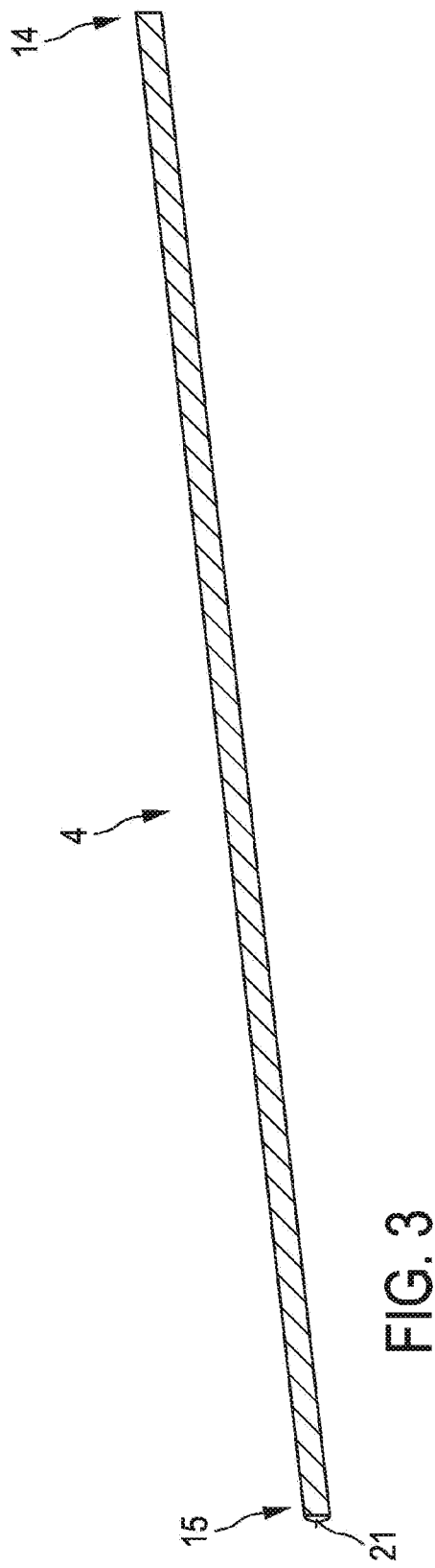

MEDICAL INSTRUMENT

CROSS-REFERENCE TO RELATED APPLICATIONS

This application is the United States national stage entry of International Application No. PCT/EP2022/070885, filed on Jul. 26, 2022, and claims priority to German Application No. 102021 208 391.9, filed on Aug. 3, 2021. The contents of International Application No. PCT/EP2022/070885 and German Application No. 10 2021 208 391.9 are incorporated by reference herein in their entireties.

FIELD

The invention relates to a medical instrument, in particular for applying medical clips, having a handle device with a fixed handle part and with a movable handle part which is movable relative to the fixed handle part, a shaft extending between a proximal shaft end and a distal shaft end, wherein the proximal shaft end is releasably connected to the handle device, and wherein the distal shaft end has an instrument jaw which is openable and/or closable by means of an actuation of the movable handle part, and having an elongate push-pull element which is guided axially movably in an elongate cavity of the shaft and which, for force and movement transmission, is operatively connected proximally to the movable handle part and distally to the instrument jaw.

BACKGROUND

A medical instrument of this kind is known from EP 0 688 187 B1 in the form of a medical forceps for use in endoscopic operations. The known medical forceps has a handpiece with a fixed handle part and a movable handle part. Moreover, the medical forceps has an elongate shaft in the form of an outer tube, which is connected releasably to the handpiece. A pull rod is guided axially movably in the outer tube. The pull rod is operatively connected at one end to a forceps jaw, mounted distally on the outer tube, and at the other end to the movable handle part. The outer tube can be disassembled, together with the forceps jaw and the pull rod, from the handpiece. This in particular for cleaning and sterilizing.

SUMMARY

The object of the invention is to make available a medical instrument of the aforementioned type which permits particularly simple and thorough cleaning.

This object is achieved by the fact that the proximal shaft end has an opening leading into the cavity, which opening is configured for introducing a fluid flow in the direction of the distal shaft end, and that a functional element is arranged in the cavity, said functional element having a plurality of fluid-guiding vanes which are arranged offset in the circumferential direction of the shaft and which are configured to generate, in the fluid flow, a swirling motion oriented in the circumferential direction of the shaft. The solution according to the invention permits particularly effective flushing of the cavity of the shaft. This permits particularly simple and thorough cleaning. The opening provided according to the invention is configured for introducing into the cavity a fluid that is provided for cleaning purposes. The fluid used can be, for example, a medical cleaning liquid, a disinfecting solution or the like. The functional element provided according to the invention influences the flow properties of the fluid flow introduced into the cavity through the opening. For this purpose, the functional element has the plurality of fluid-guiding vanes arranged offset in the circumferential direction of the shaft. The fluid flow directed distally from the opening is deflected in the circumferential direction by the fluid-guiding vanes, such that a rotational flow component (swirling) is generated. In other words, the fluid-guiding vanes generate turbulence. The functional element can also be designated as a swirl generator or vortex generator. The inventors have found that even more thorough cleaning of the cavity can be achieved by the swirling motion and/or turbulence of the fluid flow. The medical instrument according to the invention can be transferred, particularly for cleaning purposes, between an assembly state, ready for use, and a disassembly state. In the assembly state, the proximal shaft end is connected releasably to the handle device. In the disassembly state, the shaft and the handle device are spatially separated from each other, for which purpose the proximal shaft end is released from the handle device. The releasable connection between the proximal shaft end and the handle device is, for example, a clamp, plug, latch and/or screw connection. The opening is accessible for introduction of the fluid flow at least in the disassembly state. Alternatively or in addition, the opening can be accessible in the assembly state. In one embodiment, the shaft has a distally arranged further opening, which functions as an outlet for the fluid flow introduced into the cavity. Alternatively, the further opening can be arranged at the proximal shaft end. In a further embodiment, no defined further opening is present as outlet. Instead, for example, the opening at the proximal shaft end can be configured as an inlet for the introduction of the fluid flow and as an outlet for the discharge of the fluid flow. The shaft extends preferably in a straight line between its proximal shaft end and its distal shaft end. Preferably, the shaft is at least in part tubular and/or hollow-cylindrical. The shaft can be produced in one piece or in multiple pieces. The cavity is preferably oriented coaxially with respect to the shaft and/or extends coaxially between the proximal shaft end and the distal shaft end. The push-pull element serves to transmit force and movement from the movable handle part to the instrument jaw. The instrument jaw is openable and/or closable by means of an actuation of the movable handle part. Preferably, the instrument jaw is formed between two jaw parts which are movable relative to each other and which, in the closure position, are moved onto each other and, in the open position, are moved away from each other. The movable handle part is preferably movable, relative to the fixed handle part, between a non-actuated rest position and an actuated working position. The instrument jaw is movable between a closed position and an open position. Upon actuation of the movable handle part, the push-pull element can act on the instrument jaw with a pulling and/or pushing action, the latter being preferred. With a pulling action, the push-pull element functions as a pulling element. With a pushing action, the push-pull element functions as a pushing and/or thrust element. Between its proximal end and its distal end, the push-pull element is preferably straight and/or coaxial to the cavity. Preferably, the push-pull element is guided in the shaft, more precisely in the cavity thereof, interlockingly in the radial direction and with a sliding movement in the axial direction. The medical instrument is preferably provided for laparoscopic operations. The medical instrument can be, for example, in the form of a medical forceps, scissors, a clamp or the like. Accordingly, the instrument jaw can be, for example, a forceps jaw, scissors jaw, clamp jaw or the like.

In one embodiment of the invention, the push-pull element is operatively connected to the instrument jaw by means of the functional element, wherein the functional element is axially movable together with the push-pull element and has a proximally arranged first supporting portion on which a distal front end of the push-pull element is supported axially, and wherein the functional element has a distally arranged second supporting portion which acts at least indirectly on the instrument jaw. Therefore, in this embodiment of the invention, the functional element has a particularly advantageous multiple function. On the one hand, the functional element functions as a swirl and/or vortex and/or turbulence generator. On the other hand, the functional element functions at the same time as a mechanical transmission element for transmitting force and movement from the push-pull element to the instrument jaw and/or vice versa. In this way, the number of structural parts needed can be reduced and a particularly simple design of the medical instrument can be achieved. Upon actuation of the movable handle part, the push-pull element is moved axially in the cavity of the shaft. When acted upon for pushing, the push-pull element is moved in the distal direction. When acted upon for pulling, the push-pull element is moved in the proximal direction. The functional element is axially movable together with the push-pull element. For the force-transmitting and movement-transmitting operative connection to the push-pull element, the functional element has the proximally arranged first supporting portion. The latter interacts with the distal front end of the push-pull element for pushing and/or pulling. Preferably, the distal front end of the push-pull element is axially supported directly on the first supporting portion. For transmitting force and movement to the instrument jaw, the functional element has the distally arranged second supporting portion. The latter is operatively connected at least indirectly to the instrument jaw.

In a further embodiment of the invention, a spring element configured for spring-loaded restoring of the push-pull element is arranged in the cavity, wherein the spring element is operatively connected to the push-pull element by means of the functional element and for this purpose is supported axially on a distally arranged third supporting portion of the functional element. Therefore, in this embodiment of the invention, the functional element functions additionally as a mechanical transmission element for transmitting the pre-tensioning of the spring element to the push-pull element. In this way, the number of structural parts needed can be further reduced and an even more simplified design can be achieved. The spring element counteracts an axial movement of the push-pull element for opening or closing the instrument jaw. Since the push-pull element is operatively connected on the one hand to the instrument jaw and on the other hand to the movable handle part, the spring element moreover indirectly effects a spring-loaded restoring of the instrument jaw, preferably from the closed position to an opened position, and of the movable handle part in the direction of a non-actuated rest position. The spring element is arranged on a distal side of the functional element. Starting from the opening arranged at the proximal shaft end, the fluid flows in the distal direction through the cavity. Since the spring element is arranged on the distal side of the functional element, the fluid flow hits the spring element with an already generated swirling motion. In this way, the spring element can be cleaned particularly thoroughly.

In a further embodiment of the invention, the spring element is a helical spring wound in the circumferential direction of the shaft, wherein the fluid-guiding vanes are designed and/or arranged in such a way that a direction of the generated swirling motion and a direction of winding of the helical spring are oriented in the same sense. In this way, the cleaning of the spring element can be improved still further. The inventors have in fact found that, as regards the achievable cleaning result, still further improved flow properties can be obtained if the direction of the swirling motion and the direction of winding of the helical spring are oriented in the same sense. Oriented in the same sense means that, in a common axial direction of view along the shaft, the swirling motion, generated by means of the functional element, and the windings of the helical spring are each directed clockwise or each directed anticlockwise about the longitudinal axis.

In a further embodiment of the invention, the fluid-guiding vanes each have a radially outwardly oriented fitting surface, wherein the functional element is held in the cavity by means of a fit between the fitting surfaces and a radially inwardly oriented inner wall surface of the shaft. Here, the functional element is held at least in the radial direction. In addition, the functional element can be held axially in the cavity by mean of the fit. This at any rate if no axial mobility of the functional element is provided. The fit can be an interference fit, transition fit or clearance fit. In this embodiment of the invention, it is possible to do without separate bearing and/or fastening elements for mounting and/or fastening the functional element in the shaft. If the functional element is guided axially movably in the cavity together with the push-pull element, the fitting surfaces of the fluid-guiding vanes slide along the inner wall surface of the shaft. In the radial direction, the fitting surfaces and the inner wall surface interact in interlocking fashion. Preferably, the inner wall surface of the shaft has a circular cylindrical shape. The fitting surfaces are each designed as convex segments of a cylindrical envelope.

In a further embodiment of the invention, the functional element is produced in one piece from a plastic material or a metal material. In this way, additional design advantages are achieved. In an alternative embodiment, the functional element is produced in multiple pieces. The functional element can be produced in part from a plastic material and in part from a metal material.

In a further embodiment of the invention, the push-pull element, for assembly purposes, is able to be pushed axially through the opening into the shaft and, for disassembly purposes, is able to be pulled axially through the opening out of the shaft. In this embodiment of the invention, the opening therefore has a particularly advantageous multiple function. On the one hand, the opening serves as an inlet for introduction of the fluid flow. On the other hand, the opening serves at the same time as a passage for the push-pull element during assembly on and disassembly from the shaft. The push-pull element is able to be pulled axially out of the cavity through the opening at least when the proximal shaft end is released from the handle device and the medical instrument adopts its disassembly state.

In a further embodiment of the invention, the opening is provided with a fluid connector. The fluid connector can be, for example, a Luer connector, a connector marketed under the trademark NRFIT™, or the like. The fluid connector is configured for fluid-tight connection to a complementary fluid connector. In this way, a fluid line provided with such a complementary fluid connector can be attached to the opening. In this way, the fluid flow can be introduced with an overpressure through the opening. This permits still further improved cleaning.

The invention further relates to a shaft for a medical instrument, having a distal shaft end, which is configured to receive an openable and closable instrument jaw, a proximal shaft end, which is configured for releasable connection to a handle device of the medical instrument, and an elongate cavity which is configured to receive in an axially movable manner an elongate push-pull element for force and movement transmission between the handle device and the instrument jaw. According to the invention, the proximal shaft end has an opening leading into the cavity, which opening is configured for introducing a fluid flow in the direction of the distal shaft end, and a functional element is arranged in the cavity, said functional element having a plurality of fluid-guiding vanes which are arranged offset in the circumferential direction of the shaft and which are configured to generate, in the fluid flow, a swirling motion oriented in the circumferential direction of the shaft. The shaft according to the invention can be cleaned particularly easily and thoroughly. For further explanation, and in order to avoid repetition, express reference is made to what has been said concerning the medical instrument according to the invention. Embodiments of the shaft according to the invention correspond to embodiments of the medical instrument according to the invention. The shaft according to the invention is particularly advantageously suitable for a medical forceps. However, the shaft according to the invention is also suitable for further medical instruments having a proximally arranged handle device and a distally arranged instrument jaw. Particular examples that may be mentioned are medical retractors, scissors, clamps or the like.

BRIEF DESCRIPTION OF THE DRAWINGS

Further advantages and features of the invention will become clear from the following description of a preferred exemplary embodiment of the invention which is shown in the drawings.

FIG. 2 shows a schematic perspective longitudinal sectional view of the shaft according to FIG. 1;

FIG. 3 shows a schematic perspective longitudinal sectional view of a push-pull element of the medical instrument according to FIG. 1, wherein the push-pull element is guided axially movably in the shaft in the assembly state (FIG. 1);

DETAILED DESCRIPTION

Figure 1:
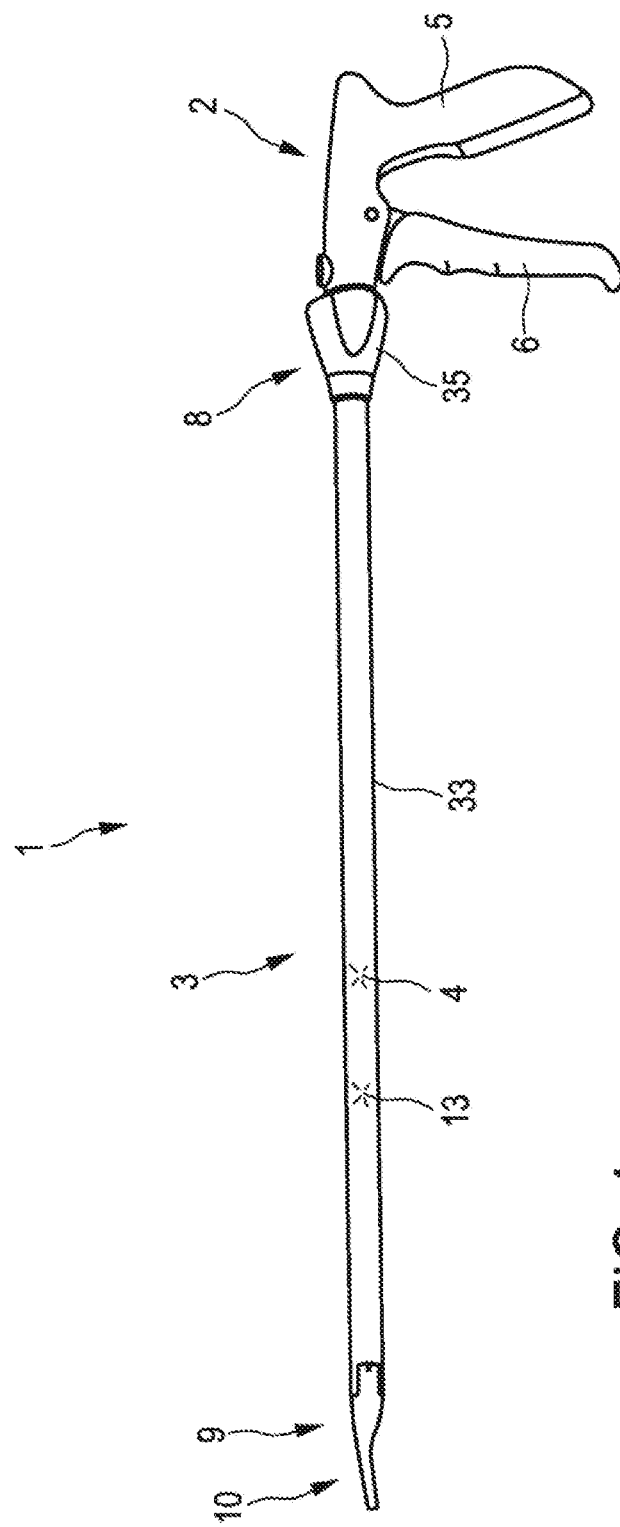
FIG. 1 shows a schematic side view of an embodiment of a medical instrument according to the invention with a handle device, and with a shaft designed according to the invention, which shaft is mounted releasably on the handle device.

According to FIG. 1, a medical instrument for use in laparoscopic operations is provided. In the present case, the medical instrument is in the form of a medical forceps 1 and is used to apply medical clips, and it can therefore also be designated as a medical clip applicator.

The medical forceps 1 has a handle device 2, an elongate shaft 3 (see FIG. 2) and a push-pull element 4 (see FIG. 3).

Figure 4:
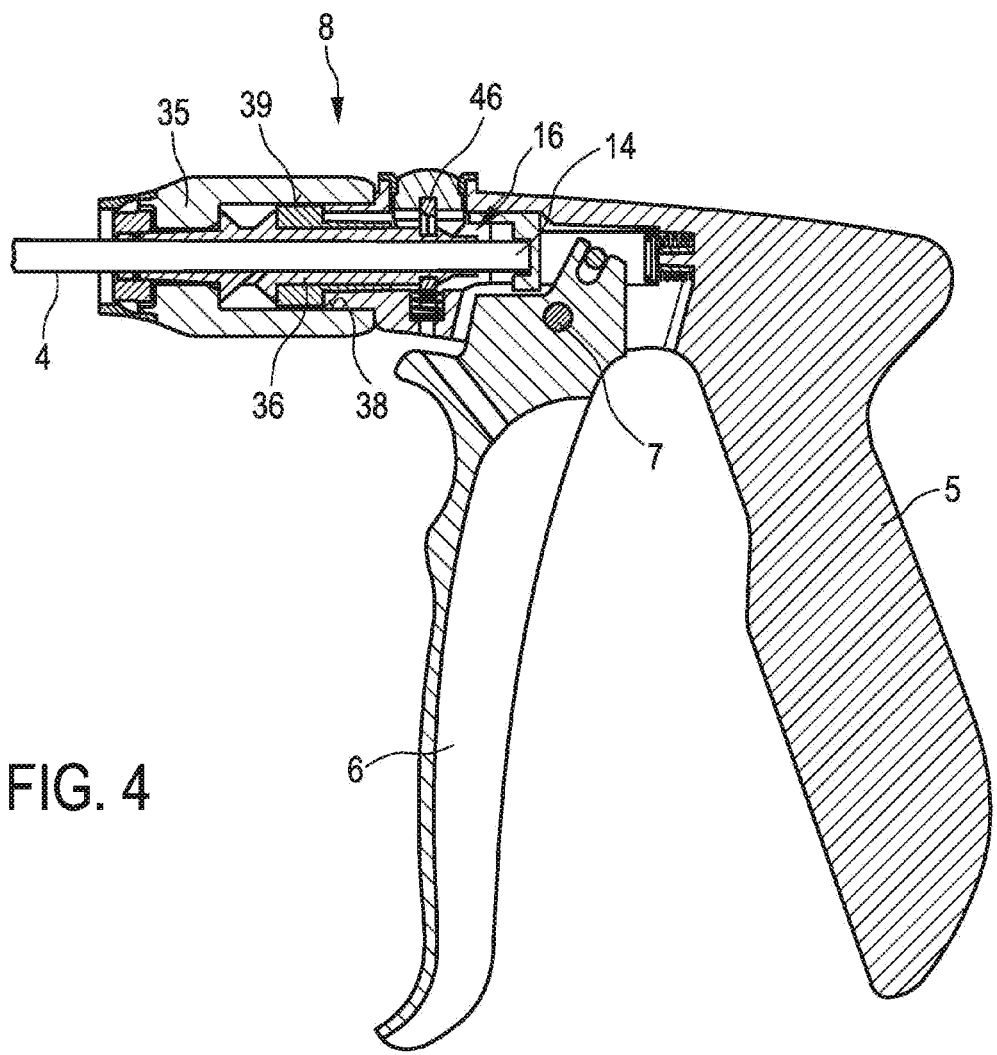
FIG. 4 shows a schematic, partially cutaway longitudinal sectional view of the medical instrument according to FIG. 1 in the region of the handle device.

The handle device 2 has a fixed handle part 5 and a movable handle part 6. The movable handle part 6 is manually movable relative to the fixed handle part 5 between a non-actuated rest position (see FIGS. 1 and 4) and an actuated working position (not shown in detail in the drawings).

In the embodiment shown, the movable handle part 6 is pivotable relative to the fixed handle part 5 about a pivot pin 7. In the non-actuated rest position, the movable handle part 6 is pivoted clockwise about the pivot pin 7 away from fixed handle part 5. In the actuated working position, the movable handle part 6 is pivoted anticlockwise about the pivot pin 7 towards the fixed handle part 5. In an embodiment not shown in the drawings, the movable handle part is alternatively or additionally movable in translation between its rest position and its working position.

Figure 5:
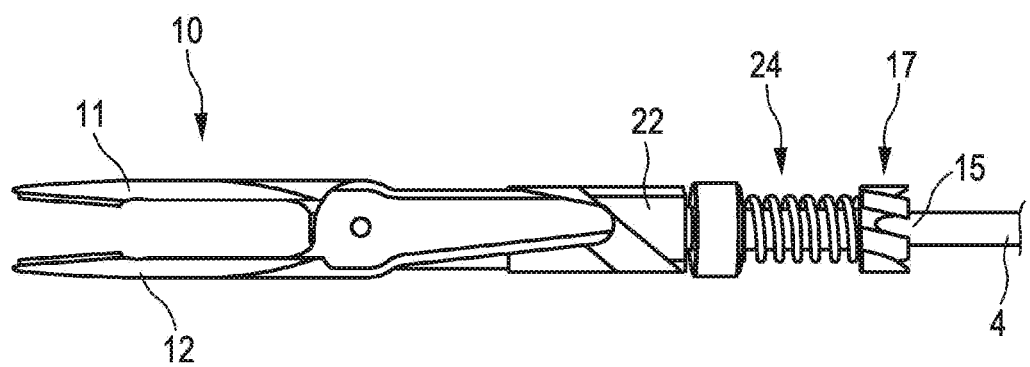
FIG. 5 shows a schematic, partially cutaway side view of a detail of the shaft in the region of a distally arranged instrument jaw, with individual structural parts and/or portions left out.

The shaft 3 is elongate between a proximal shaft end 8 and a distal shaft end 9. The proximal shaft end 8 is connected releasably to the handle device 2. Through release of the connection, the shaft 3 can be released from the handle device 2, and the medical forceps 1, starting from the ready-for-use assembly state shown in FIG. 1, can be transferred to a dismantled disassembly state. The disassembly state serves primarily for cleaning and/or disinfecting of the shaft 3 and/or of the handle device 2. The distal shaft end 9 has an instrument jaw in the form of a forceps jaw 10 which, by means of an actuation of the movable handle part 6, is movable between a closed position (FIG. 1) and an open position (FIGS. 2 and 5).

In the embodiment shown, the forceps jaw 10 is formed between a first jaw part 11 and a second jaw part 12. In the closed position, the first jaw part 11 and the second jaw part 12 are moved towards each other. In the open position, the first jaw part 11 and the second jaw part 12 are moved away from each other.

The function and design of the forceps jaw 10 are not essential to the present invention, and therefore further explanations in this connection are not needed. In embodiments not shown in the drawings, the shaft has, instead of the forceps jaw 10, an effector which can be, for example, scissors, a retractor, a clamp or the like.

The push-pull element 4 is configured to transmit force and movement between the movable handle part 6 and the forceps jaw 10. The push-pull element 4 is elongate between a proximal end 14 and a distal end 15. In the assembly state, the proximal end 14 is operatively connected to the movable handle part 6, the distal end 15 is operatively connected to the forceps jaw 10, and the push-pull element 4 is arranged axially movably in a cavity 13 of the shaft 3. The cavity 13 is elongate between the proximal shaft end 8 and the distal shaft end 9. In the assembly state, the shaft 3 and the push-pull element 4 are oriented coaxially. In the disassembly state, the push-pull element 4 is removed from the shaft 3, more precisely pulled in the proximal direction out of the cavity 13.

To permit simple and particularly thorough cleaning, the shaft 3 has, at its proximal shaft end 8, am opening 16 leading into the cavity 13. A fluid, for example a cleaning liquid, a disinfecting solution or the like, can be introduced into the shaft 3 via the opening 16. A fluid flow that results from this flows, starting from the opening 16, in the direction of the distal shaft end 9.

The shaft 3 moreover has a functional element 17 arranged in the cavity 13. The functional element 17 serves to advantageously influence said fluid flow. For this purpose, the functional element 17 has a plurality of fluid-guiding vanes 18 (see FIG. 7) arranged offset in the circumferential direction of the shaft 3. The fluid-guiding vanes 18 are configured to generate, in the fluid flow, a swirling motion oriented in the circumferential direction of the shaft 3. In other words, the fluid-guiding vanes 18 deflect the fluid flow in the circumferential direction of the shaft 3. The rotational flow component associated with this deflection can be designated as swirling or turbulence. Accordingly, the functional element 17 can also be designated as a swirl or turbulence generator.

In the embodiment shown, the opening 16 for introducing said fluid is accessible only when the shaft 3 is released from the handle device 2 and the push-pull element 4 is removed from the shaft 3 (disassembly state). However, such a design and/or arrangement is not mandatory as regards the present invention. In an embodiment not shown in the drawings, the opening is arranged on a radial outer face of the proximal shaft end and, as a result, is also accessible when the medical forceps 1 is in its assembly state ready for use (FIG. 1).

Further structural and functional features of the present embodiment are explained in detail below. These features are to be regarded as advantageous, but not essential, in terms of the underlying invention.

In the embodiment shown, the push-pull element 4 is operatively connected to the forceps jaw 10 by means of the functional element 17. The functional element 17 thus functions at the same time as a mechanical transmission element for transmitting force and movement from the push-pull element 4 to the forceps jaw 10 and/or vice versa. For this purpose, the functional element 17 has a proximally arranged first supporting portion 19 and a distally arranged second supporting portion 20 (see FIG. 8). In the assembly state, the first supporting portion 19 interacts with a distal front end 21 of the push-pull element 4. The second supporting portion 20 acts at least indirectly on the forceps jaw 10. In the present case, the second supporting portion 20 is supported in the distal direction on a structural part 22 of the forceps jaw 10.

The push-pull element 4 can in principle act on the forceps jaw 10 by pushing and/or pulling. In the embodiment shown, a distal movement of the push-pull element 4 causes closing of the forceps jaw 10. Accordingly, the push-pull element 4 has a pushing action and can therefore also be designated as push element. The pushing force needed to close the forceps jaw 10 is transmitted via the distal front end 21 of the push-pull element 4 to the first supporting portion 19 and from there onwards to the structural part 22 via the second supporting portion 20. The same applies in respect of the resulting axial movement. The functional element 17 is axially movable together with the push-pull element 4.

In an embodiment not shown in the drawings, the push-pull element interacts with the functional element in a pulling action. For this purpose, the push-pull element and the functional element are joined to each other to transmit a pulling force in a manner basically known to a person skilled in the art, for example by means of a screw connection or the like.

In the present case, the functional element 17 is screwed onto the structural part 22. For this purpose, the functional element 17 has an axial through-bore 23. The through-bore 23 can be provided with a thread which is screwed together with a mating thread of the structural part 22. Alternatively, the through-bore 23 can be configured to receive a connecting screw, which is in turn screwed onto the structural part 22.

In the present case, a spring element 24 is also arranged in the cavity 13. The spring element 24 serves for spring-loaded restoring of the push-pull element 4 in the proximal direction. The spring element 24 is operatively connected to the push-pull element 4 by means of the functional element 17. The spring element 24 is for this purpose axially supported on a distally arranged third supporting portion 25 of the functional element 17. The restoring force of the spring element 24 acts in the proximal direction on the third supporting portion 25 and from there acts, via the first supporting portion 19, on the distal front end 21 of the push-pull element 4. In a distal movement of the push-pull element 4 for closing the forceps jaw 10, the resulting axial force and axial movement are transmitted, starting from the distal front end 21, via the first supporting portion 19 to the third supporting portion 25 and from there onwards to the spring element 24. In this way, the spring element 24 is pretensioned. At its distal end directed away from the functional element 17, the spring element 24 is supported axially immovably on a portion (not shown in detail) of the shaft 3. The functional element 17 thus additionally function as a mechanical transmission element for transmitting force and movement between the push-pull element 4 and the spring element 24.

Figure 6:
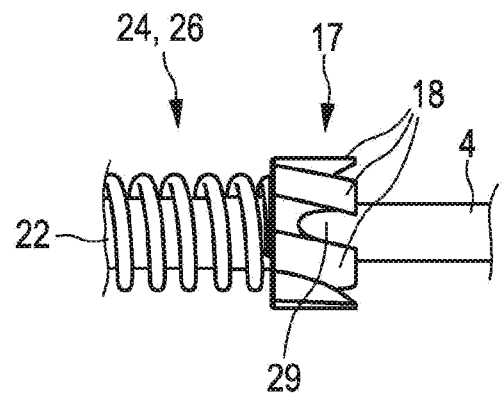
FIG. 6 shows a cutaway perspective detail of a part of the view according to FIG. 5, in the region of a functional element.

The spring element 24 in the present case is a helical spring 26 wound in the circumferential direction of the shaft 3. As is shown in particular in FIG. 6, the fluid-guiding vanes 18 are designed and/or arranged in such a way that a direction of the generated swirling motion of the fluid flow and a direction of winding of the helical spring 26 are oriented in the same sense. In the embodiment shown, the direction of winding of the helical spring 26 is oriented clockwise, in relation to a viewing direction oriented axially in the direction of the distal shaft end 9. The same applies, mutatis mutandis, to the direction of the swirling motion generated by means of the fluid-guiding vanes 18. The fluid-guiding vanes 18 are inclined and/or pitched clockwise in relation to the distal direction. Since the winding of the helical spring 26 and the swirling by the functional element 17 are oriented in the same direction, it is possible to achieve particularly simple and thorough cleaning in the region of the spring element 24.

Figure 7:
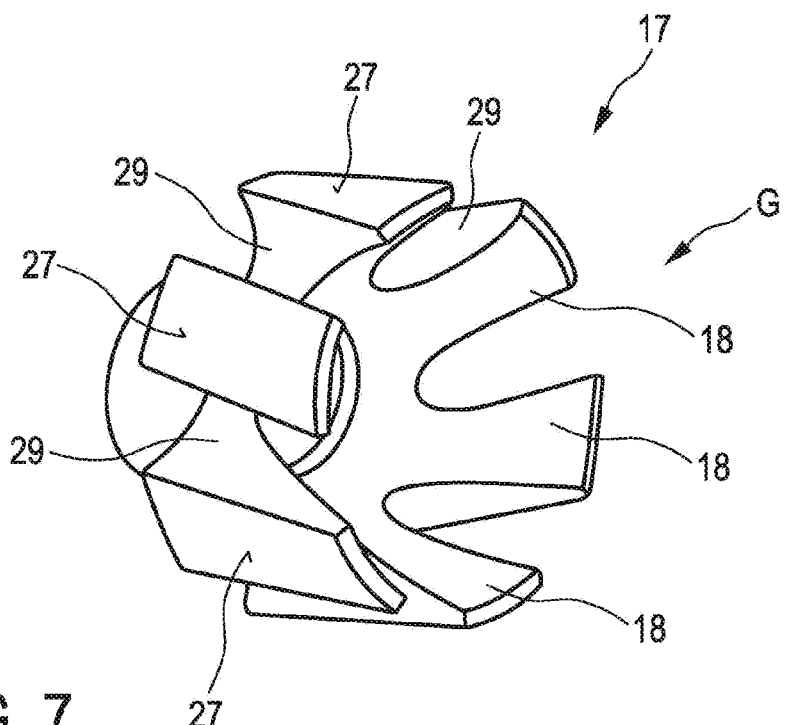
FIG. 7 shows a schematic perspective view of the functional element.

As is further shown in FIG. 7, the fluid-guiding vanes 18 each have a radially outwardly oriented fitting surface 27. The functional element 17 is held in the cavity 13 by means of a fit between the fitting surfaces 27 and a radially inwardly oriented inner wall surface 28 of the shaft 3. In the present case, by means of said fit, the functional element 17 is held interlockingly on the inner wall surface 28 in the radial direction R of the cavity 13 and/or of the shaft 3. To ensure the above-explained mobility of the functional element 17 in the axial direction of the cavity 13 and/or of the shaft 3, the fit in the present case is a clearance fit. The clearance fit permits a relative sliding mobility between the fitting surfaces 27 and the inner wall surface 28 in the axial direction A. In an embodiment not shown in the drawings, the functional element is fixed relative to the cavity and/or shaft with respect to the axial direction. The fit can accordingly be designed as an interference fit.

Figure 8:
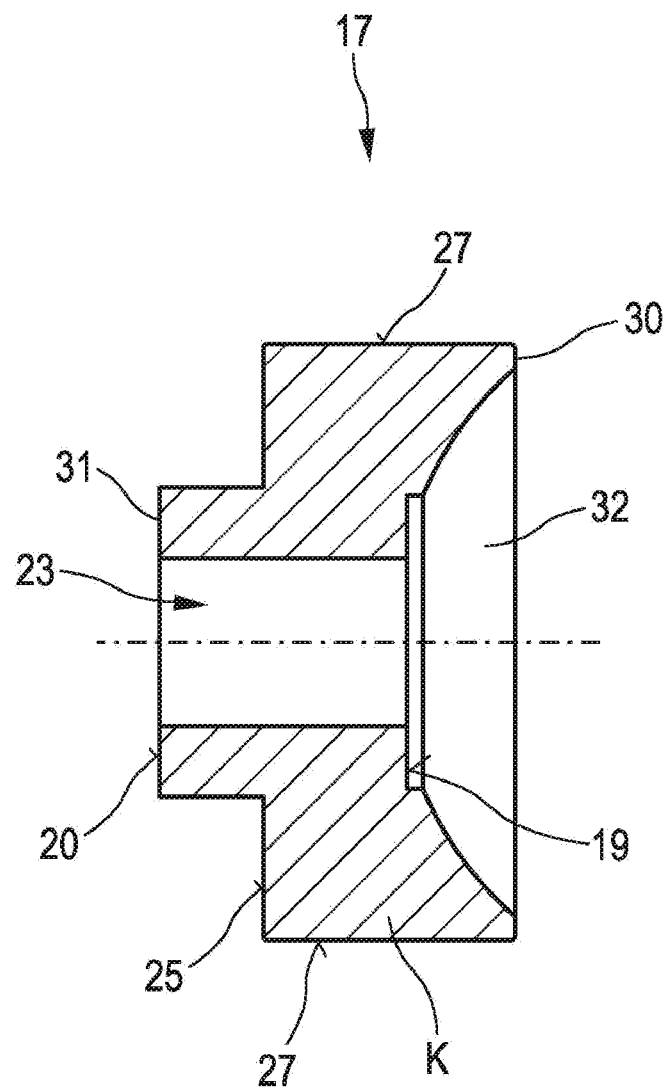
FIG. 8 shows a schematic and greatly simplified longitudinal sectional view of the functional element according to FIG. 7.

Further details of the present design of the functional element 17 are shown in particular in FIGS. 7 and 8. In the embodiment shown, the functional element 17 has a circular cylindrical basic shape G, which is provided with a plurality of incisions 29 arranged offset in the circumferential direction. One of the fluid-guiding vanes 18 is in each case arranged between two incisions 29. To put it another way, one of the incisions 29 is in each case arranged between two fluid-guiding vanes 18. The incisions 29 extend from the outside inwards in the radial direction R. The incisions 29 are inclined and/or pitched in relation to the axial direction A. This can be seen in particular in FIG. 6. The functional element 17 extends axially between a proximal end 30 and a distal end 31. Starting from the proximal end 30, the functional element 17 has a concave recess 32. The concave recess 32 is curved in in the distal direction. In the present case, a normal direction of the first supporting portion 19 is oriented parallel to the axial direction A and proximally. The normal directions of the second supporting portion 20 and of the third supporting portion 25 are each oriented parallel to the axial direction A and distally. Moreover, the supporting portions 19, 20, 25 are each designed as circular surfaces. In the embodiment shown, the functional element 17 is produced in one piece. A plastic material K is chosen as the material. In an embodiment not shown, a metal material and/or a multi-part production of the functional element can instead be provided.

Figure 9:
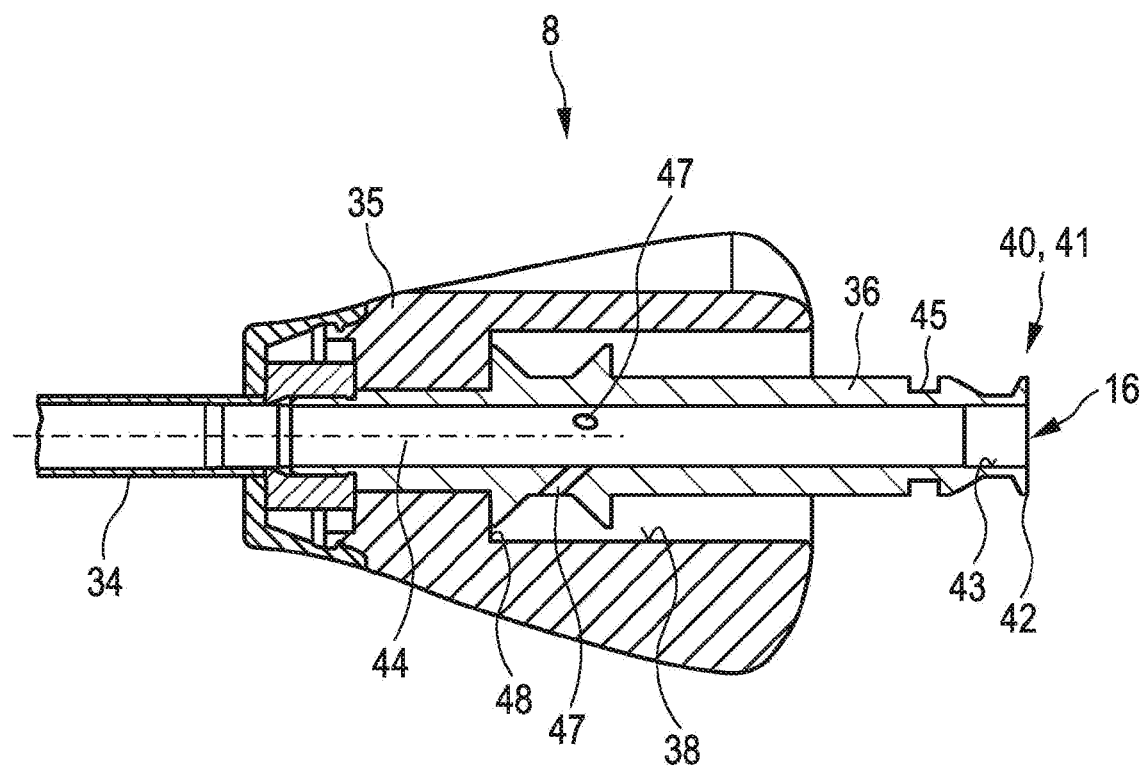
FIG. 9 shows a partially cutaway longitudinal sectional view of a proximal shaft end of the shaft according to FIG. 2.

Further details of the shaft 3 are shown in particular in FIGS. 2 and 9. In the present embodiment, the shaft has an outer tube 33, an inner tube 34, a shaft attachment 35 and a shaft extension 36. The outer tube 33 and the inner tube 34 are each elongate between the proximal shaft end 8 and the distal shaft end 9. The outer tube 33 and the inner tube 34 are oriented coaxially along the axial direction A. The outer tube 33 has a circular cylindrical hollow cross section. The same applies to the inner tube 34. The outer tube 33 delimits the cavity 13, which accordingly has a circular cylindrical shape. The inner tube 34 is arranged in the cavity 13. Moreover, the inner tube 34 is mounted fixedly in the outer tube 33 by means of a plurality of bearing elements 37. In the present case, the bearing elements 37 are of annular design. An inner jacket surface (not shown in detail) of the outer tube 33 forms the inner wall surface 28 of the shaft 3. The inner tube 34 serves in particular for axially movable mounting and/or guiding of the push-pull element 4. The shaft attachment 34 is fixedly connected to the outer tube 33 and/or inner tube 34 in a manner known in principle to a person skilled in the art and serves in particular as a connecting element for releasably connecting the shaft 3 to the handle device 2. For this purpose, the shaft attachment 35 has an inner cone 38, which matches an outer cone 39 of the handle device 2. In the assembly state (FIG. 1), the inner cone 38 and the outer cone 39 are plugged together releasably along the axial direction A. As an alternative or addition to the plug-in connection formed in this way, a screwing, latching and/or clamping connection between the proximal shaft end 8 and the handle device 2 may also be present.

In the embodiment shown, the opening 16 is arranged on the shaft extension 36. The shaft extension 36 has a fluid connector 40 assigned to the opening 16. In the embodiment shown, the fluid connector is a Luer lock connector 41 with an outer thread 42 and with an inner cone 43. The shaft extension 36 is oriented coaxially with respect to the shaft attachment 35. The latter is coaxial to the inner tube 34 and/or the outer tube 33. The shaft extension 36 has a lumen 44 extending in the distal direction starting from the opening 16. The lumen 44 opens into the inner tube 34 and thus at least indirectly also into the outer tube 33 and/or the cavity 13.

In the embodiment shown, the shaft extension 36 has a notch 45 which, for the purpose of locking the plug-in connection formed between the inner cone 38 and the outer cone 39, interacts with a latch 46 present on the handle device 2. The design and function of said locking are immaterial in terms of the present invention. The same applies analogously as regards the transmission of force and movement between the movable handle part 6 and the proximal end 14 of the push-pull element 4. The aforementioned aspects of the present embodiment are therefore not explained in any more detail.

The shaft extension 36 has a plurality of flushing channels 47 which branch off in the radial direction from the lumen 44. Starting from the lumen 44, the flushing channels 47 extend in the radial direction R as far as an outer face of the shaft extension 36. In this way, the fluid flow introduced for cleaning purposes into the opening 16 can pass through the flushing channels 47 into the region of the inner cone 38 of the shaft attachment 35. This further improves the cleaning of the shaft 3. The flushing channels 47 can be arranged in different positions and can be oriented differently in relation to the direction of flow of the fluid. The present embodiment is intended to ensure that the flow of fluid is conveyed via the flushing channels 47 as far as a distal front edge 48 of the inner cone 38.

Starting from the ready-for-use assembly state of the medical forceps 1 as shown in FIG. 1, cleaning can be carried out as follows:

Firstly, the shaft 3 is disassembled from the handle device 2. For this purpose, the plug-in connection between the proximal shaft end 8 and the handle device 2 is released. To be more exact, the inner cone 38 is withdrawn from the outer cone 39 and/or vice versa. Before this, the latch-notch connection, present here for the purpose of locking the plug-in connection, between the latch 46 and the notch 45 is released. After the shaft 3 has been disassembled from the handle device 2, the push-pull element 4 is removed in the proximal direction from the shaft 3. In the present case, this is done through the opening 16. A fluid line provided with a fluid connector is then attached to the fluid connector 40 of the shaft 3. The fluid provided for cleaning, for example a cleaning liquid or disinfecting solution, is conveyed from the fluid line into the cavity 13 via the opening 16. The resulting fluid flow flows axially in the direction of the distal shaft end 9. In the present case, the fluid flow, starting from the fluid line, passes through the opening 16 into the lumen 44 and from the latter onwards into the inner tube 34. The fluid flows out in the region of a distal end (not shown in detail) of the inner tube 34, hits the functional element 17, is provided with said swirling motion and/or turbulence by the functional element 17, and then hits the spring element 24.

In the embodiment shown, the fluid flow emerges from the shaft 3 through openings and/or gaps (not shown in detail) in the region of the distal shaft end 9. Alternatively or in addition, the inner tube 34, the outer tube 33 and the bearing elements 37 can be designed in such a way that a proximal return flow can be established in the annular space 49 formed between the outer tube 33 and the inner tube 34 and, in the region of the shaft attachment 35, emerges from the shaft 3 through openings and/or gaps (not shown in detail). However, in the embodiment shown here, the annular space 49 is closed in a fluid-tight manner. For this purpose, the inner tube 34 and the outer tube 33 are cohesively welded to each other in the region of the bearing elements 37.

A further effect of the flushing channels 47 is that the fluid flow emerges from the lumen 44 in the radial direction and hits the front edge 48. In this way, the bottom of the "bore" or inner cone 38 is cleaned with positive pressure. Starting from the front edge 48, the liquid used can flow off in the proximal direction along the inner cone 38.

The invention claimed is:

1. A medical instrument comprising:
A handle device with a fixed handle part and a movable handle part that is movable relative to the fixed handle part;
a shaft extending between a proximal shaft end and a distal shaft end, the proximal shaft end being releasably connected to the handle device, and the distal shaft end having an instrument jaw that is openable and/or closable by actuation of the movable handle part; and
a push-pull element that is guided axially movably in a cavity of the shaft, the push-pull element being operatively connected proximally to the movable handle part and distally to the instrument jaw for force and movement transmission,
the proximal shaft end having an opening leading into the cavity,
the opening being configured for introducing a fluid flow in a direction of the distal shaft end,
a functional element being arranged in the cavity, the functional element having a plurality of fluid-guiding vanes that are arranged offset in a circumferential direction of the shaft,
the plurality of fluid-guiding vanes being configured to generate, in the fluid flow, a swirling motion oriented in the circumferential direction of the shaft,
the push-pull element is operatively connected to the instrument jaw by the functional element,
the functional element is axially movable together with the push-pull element and has a proximally arranged first supporting portion on which a distal front end of the push-pull element is supported axially, and
the functional element has a distally arranged second supporting portion which acts at least indirectly on the instrument jaw.

2. The medical instrument according to claim 1, wherein a spring element configured for spring-loaded restoring of the push-pull element is arranged in the cavity, the spring element being operatively connected to the push-pull element by the functional element and supported axially on a distally arranged third supporting portion of the functional element.

3. The medical instrument according to claim 2, wherein:
the spring element is a helical spring,
the helical spring has a direction of winding that is wound in the circumferential direction of the shaft, and
the plurality of fluid-guiding vanes are designed and/or arranged in such a way that a direction of the swirling motion and the direction of winding of the helical spring are oriented the same.

4. The medical instrument according to claim 1, wherein:
the fluid-guiding vanes each have a fitting surface oriented radially outwardly, and
the functional element is held in the cavity by a fit between the fitting surfaces and an inner wall surface of the shaft, the inner wall surface being oriented radially inwardly.

5. The medical instrument according to claim 1, wherein the functional element consists of one piece of a plastic material or a metal material.

6. The medical instrument according to claim 1, wherein the push-pull element is configured to be pushed axially through the opening into the shaft for assembly purposes, and is able is configured to be pulled axially through the opening out of the shaft for disassembly purposes.

7. The medical instrument according to claim 1, wherein the opening is provided with a fluid connector.

8. A shaft for a medical instrument comprising:
a distal shaft end configured to receive an instrument jaw that is openable and closable;
a proximal shaft end configured for releasable connection to a handle device of the medical instrument; and
a cavity configured to receive a push-pull element in an axially movable manner for force and movement transmission between the handle device and the instrument jaw,
the proximal shaft end having an opening leading into the cavity,
the opening being configured for introducing a fluid flow in a direction of the distal shaft end,
a functional element being arranged in the cavity and having a plurality of fluid-guiding vanes that are arranged offset in a circumferential direction of the shaft,
the plurality of fluid-guiding vanes configured to generate, in the fluid flow, a swirling motion oriented in the circumferential direction of the shaft,
the push-pull element is operatively connected to the instrument jaw by the functional element,
the functional element is axially movable together with the push-pull element and has a proximally arranged first supporting portion on which a distal front end of the push-pull element is supported axially, and
the functional element has a distally arranged second supporting portion which acts at least indirectly on the instrument jaw.

* * * * *